United States Patent Office 3,455,436
Patented July 15, 1969

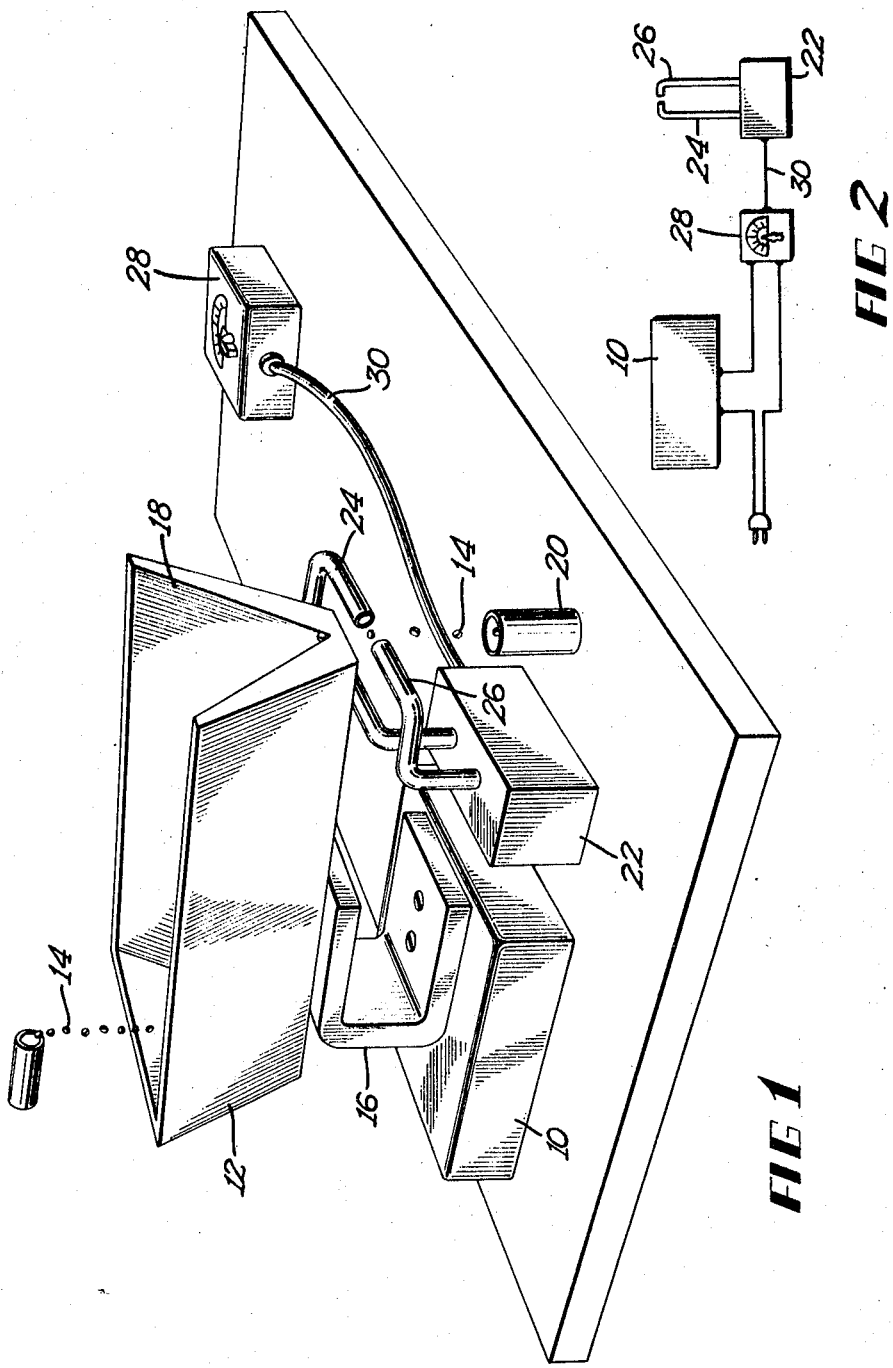

3,455,436
ARTICLE COUNTING DEVICE
Lanny R. Berke, Minneapolis, Minn., assignor of one-half to Herbert Pomish, Minneapolis, Minn.
Filed Aug. 21, 1967, Ser. No. 662,129
Int. Cl. B65b 57/20; B65g 27/10; F15c 1/00
U.S. Cl. 198—40                                    10 Claims

ABSTRACT OF THE DISCLOSURE

This invention relates to a device for counting a predetermined number of articles segregated from a mass of articles. The device employs a vibratory conveyor to impart motion to articles contained in a trough. For ease in handling, the trough is secured to the conveyor with permanent magnets. A fluidic sensor is employed to detect each article dropped off the trough end and conveys this information to a control which, upon delivery of a predetermined number of articles to a receptacle, breaks the circuit and stops the conveyor.

---

This invention relates to a device for counting and segregating a predetermined number of articles of a mass thereof. It finds particular application in the drug industry for counting pills for filling prescriptions from a large container thereof.

Devices for the purpose intended have been present in the art, but there are inherent problems in all of them. Many of the devices known to the art employ discs with perforations intended to receive a specific size article for counting. The disc then rotates and deposits the article contained in the perforation into a receptacle counting these. Devices of this type are not flexible as to article shape and costly and involved changes are required to adapt it to an article of different size or shape.

Other counters of this type known to the art employ a photoelectric cell for counting articles. These devices have the shortcomings that variation in article size necessitates an adjustment of the photoelectric cell for proper operation. The further shortcoming of the photoelectric cell type necessitates a direct conveying of the article. This presents, at least in the drug industry, a problem in that clean and hygenic conditions are difficult to maintain where several contacts are made on the pills. If to alleviate this problem a vibratory conveyor of the type used in this invention were to be employed, the photoelectric cell would not stand up since the vibration necessary for the conveyor would damage the photoelectric cell in short order.

The present invention eliminates the foregoing problems by providing a vibratory conveyor with a trough magnetically attached thereto. A fluid sensor detects the number of articles dropped off the trough and conveys this information to a control which, upon the proper number of articles being deposited in the receptacle, will stop the conveyor.

Referring now to the drawings:

FIGURE 1 is a pictorial view of the apparatus of this invention; and,

FIGURE 2 is a schematic diagram of the circuitry of this invention.

A vibratory conveyor 10 is employed in this invention. Vibratory conveyors 10 are well known and it will not be necessary to further describe it other than to describe to function whereby controlled differential vibrations are employed to impart a net movement to articles contained in a hopper for said conveyor.

In the present invention, an article storage means such as the trough 12 is employed to receive and contain articles, as for example, the pills 14 from a source thereof. Generally, a quantity of pills considerably larger than that required for the particular prescription is put into trough 12. At the end of the counting it is necessary to remove the pills 14 back to the storage container. To facilitate this, trough 12 is secured to vibratory conveyor 10 via a permanent magnet 16. Thus after the counting is finished, trough 12 may be removed from magnet 16 so that pills 14 contained therein may be poured back into the storage bottle.

Trough 12 is of such configuration that a channel 18 is formed at the delivery end thereof. Channel 18 is of such configuration as would cause pills 14 to be delivered off the end of trough 12 one at a time.

A receptacle bottle 20 is, in operation, positioned below the delivery end of trough 12.

A counting means is employed to detect the number of pills 14 as they drop off the end of trough 12. The desired counting means in the present invention takes the form of a fluidic sensor 22. Once again, the fluidic sensor 22 is well known, and includes a pair of probes 24 and 26 which transmit and receive, respectively, a fluid stream. An interruption to the fluid stream passing between probes 24 and 26 creates a pulse in the fluid stream. Fluidic sensor 22 is provided with a fluidic-electrical interface which converts the fluid pulse caused by interruption in the fluid stream by the passing of a pill 14 into an electrical impulse.

A control means 28 which can be set to break an electrical circuit following a predetermined number of electrical impulses is provided.

Electrical connection means are provided for transmitting electrical impulses created at the fluidic-electrical interface of fluidic sensor 22 to control 28. Such means are suitably represented by the electrical wire 30 between fluidic sensor 22 and control means 28.

In operation pills 14 are poured from a storage bottle into the trough 12. The number of pills 14 to be delivered to receptacle 20 is controlled by making the appropriate setting on control 28. When control 28 is set, the vibratory conveyor 10 is energized and begins pills 14 in motion towards channel 18. As pills 14 drop off the edge of trough 12 one by one, they pass through a fluid stream between fluidic sensor probes 24 and 26 interrupting the fluid stream there between. Each time a pill 14 passes said fluid stream a fluid impulse is created and registers at a fluidic-electrical interface within fluidic sensor 22. At the fluidic-electrical interface, fluidic sensor 22, said fluid pulse is converted to an electrical impulse which is transmitted to control 28 via wire 30. It will be readily appreciated that each time a pill 14 drops off a trough 12 an impulse is formed and registered on control 28. Thus, when a sufficient number of pills 14 fall off the trough 12 into receptacle 20 so that control 28 registers sufficient electrical impulses for the predetermined number, the circuit is broken and vibratory conveyor is de-energized. Trough 12 may then be removed from magnet 16 so that excess pills 14 may be replaced in the storage bottle.

It will be noted, while the particular application was directed toward the use of the present invention in association with pharmaceuticals and pills that it is not necessarily limited to that application since it may be used successfully to count many and sundry types of small articles.

I claim:

1. A counting device for delivering a predetermined number of articles to a receptacle comprising in combination: article storage means having channeling means to limit delivery of articles to a receptacle one at a time; transport means for selectively moving articles through the channeling means of said storage means to the receptacle, means releasably mounting said storage means on said transport means; counting means operably located relative to said storage means for counting the number of articles discharged from the channeling means and delivered to the receptacle; and, control means operably secured to said counting means and to said transport means, said control means being adapted to be selectively adjusted for a predetermined number of articles to be delivered to the receptacle and also to stop said transport means when the predetermined number of articles have been delivered to the receptacle.

2. The counting device of claim 1 wherein said transport means comprises a vibratory conveyor.

3. The counting device of claim 2 wherein said storage means comprises a trough removably secured to said vibratory conveyor.

4. The counting device in claim 3 wherein said trough is removably secured to said vibratory conveyor by a permanent magnet.

5. The counting device in claim 1 wherein said counting means comprises a fluidic sensor including: a pair of fluidic sensor probes positioned adjacent said storage member so that each article delivered to a receptacle will interrupt the fluid stream between said sensor probes causing a fluid pulse; and, a fluidic-electrical interface adapted to convert fluid pulses into electrical impulses adapted to be transmitted to said control means.

6. The counting device of claim 4 wherein said counting means comprises a fluidic sensor including: a pair of fluidic sensor probes positioned adjacent said trough so that each article delivered to a receptacle will interrupt the fluid stream between said sensor probes causing a fluid pulse; and, a fluidic-electrical interface adapted to convert fluid pulses into electrical impulses adapted to be transmitted to said control means.

7. A device for segregating a predetermined number of articles from a larger number thereof and delivering said pedetermined number to a receptacle, said device comprising: a storage means adapted to hold a quantity of the articles to be segregated and delivered, said storage means including means for arranging the articles for delivery one at a time; conveying means operable to move the articles in the storage means to a receptacle without direct contact with the articles; means releasably mounting the storage means on the conveying means; counting means for determining the number of articles delivered from said storage means to the receptacle, said counting means being adapted to operate without regard to shape or size of articles being segregated; and, control means operably connected to said conveying means and to said counting means so that upon the proper number of articles being segregated, as determined by said counting means and transmitted to said control means, said control means stops said coveying means from delivering further articles to the receptacle.

8. The device of claim 7 wherein the counting means comprises a fluidic sensor including: a pair of fluidic sensor probes adapted to transmit and receive respectively a fluid stream, said probes being positioned adjacent said storage means so that articles segregated from said storage means will interrupt the fluid stream between said probes and cause a fluid pulse; means for converting said fluid pulse into an electrical impulse; and, electrical connection means connecting said counting means and said control means so that electrical impulses may be conveyed from said counter means to said control means.

9. The device of claim 7 wherein said conveyor comprises a vibratory conveyor and said storage means comprises a trough magnetically secured to said vibratory conveyor.

10. The device of claim 9 wherein the counting means comprises a fluidic sensor including: a pair of fluidic sensor probes adapted to transmit and receive, respectively, a fluid stream, said probes being positioned adjacent said trough so that articles segregated from the trough will interrupt the fluid stream between said probes and cause a fluid pulse; means for converting said fluid pulse into an electrical impulse; and, electrical connection means connecting said counting means, and said control means so that electrical impulses may be conveyed from said counter means to said control means.

References Cited

UNITED STATES PATENTS

| | | | |
|---|---|---|---|
| 3,258,023 | 6/1966 | Bowles | 137—81.5 |
| 3,305,067 | 2/1967 | Mayer | 198—220 |
| 3,376,970 | 4/1968 | Roseberg | 198—40 |

RICHARD E. AEGERTER, Primary Examiner

U.S. Cl. X.R.

53—78; 137—81.5